US006862577B2

(12) United States Patent
Gagne et al.

(10) Patent No.: US 6,862,577 B2
(45) Date of Patent: Mar. 1, 2005

(54) SYSTEM AND METHOD FOR SHIPPING MATERIAL

(75) Inventors: Robert R. Gagne, Colchester, VT (US); William A. Mayville, Milton, VT (US); Margaret M. Norton, Jericho, VT (US)

(73) Assignee: International Business Machines Corporation, Armonk, NY (US)

(*) Notice: Subject to any disclaimer, the term of this patent is extended or adjusted under 35 U.S.C. 154(b) by 445 days.

(21) Appl. No.: 09/870,923

(22) Filed: May 31, 2001

(65) Prior Publication Data

US 2002/0184119 A1 Dec. 5, 2002

(51) Int. Cl.[7] ............................................. G06F 17/60
(52) U.S. Cl. ................................... 705/29; 705/28
(58) Field of Search .................. 705/29, 28; 700/107

(56) References Cited

U.S. PATENT DOCUMENTS

| | | | | | |
|---|---|---|---|---|---|
| 5,421,778 | A | * | 6/1995 | Kouramanis | 462/2 |
| 5,758,329 | A | * | 5/1998 | Wojcik et al. | 705/28 |
| 5,910,896 | A | * | 6/1999 | Hahn-Carlson | 700/231 |
| 5,923,014 | A | * | 7/1999 | Szymusiak et al. | 235/375 |
| 5,930,768 | A | * | 7/1999 | Hooban | 705/27 |
| 6,058,373 | A | * | 5/2000 | Blinn et al. | 705/26 |
| 6,167,378 | A | * | 12/2000 | Webber, Jr. | 705/8 |
| 6,324,522 | B2 | * | 11/2001 | Peterson et al. | 705/28 |
| 6,490,493 | B1 | * | 12/2002 | Dharnipragada | 700/97 |
| 6,505,094 | B2 | * | 1/2003 | Pape et al. | 700/217 |
| 6,510,997 | B1 | * | 1/2003 | Wilz et al. | 235/472.01 |
| 6,525,835 | B1 | * | 2/2003 | Gulati | 358/1.18 |
| 6,571,213 | B1 | * | 5/2003 | Altendahl et al. | 705/1 |
| 6,581,204 | B2 | * | 6/2003 | DeBusk et al. | 717/120 |
| 6,669,832 | B1 | * | 12/2003 | Saito et al. | 705/26 |
| 6,687,848 | B1 | * | 2/2004 | Najmi | 714/4 |
| 6,690,997 | B2 | * | 2/2004 | Rivalto | 700/237 |
| 6,697,702 | B1 | * | 2/2004 | Hahn-Carlson | 700/213 |
| 6,721,762 | B1 | * | 4/2004 | Levine et al. | 707/104.1 |
| 2003/0191710 | A1 | * | 10/2003 | Green et al. | 705/40 |

FOREIGN PATENT DOCUMENTS

EP   0527423 A2 *  2/1993 ................. 705/29

OTHER PUBLICATIONS

Azerity's New ProChannel, Business Wire, Jun. 2002.*

* cited by examiner

Primary Examiner—Joseph A. Fischetti
(74) Attorney, Agent, or Firm—DeLio & Peterson LLC; Robert Curcio; Richard M. Kotulak

(57) ABSTRACT

A system and method for interactive inquiry and editing throughout the life cycle of the shipping request by the requester and various approving managers. Once the request is approved, shipping labels are automatically printed, and any necessary domestic or export documentation is electronically prepared by the application software. The application is adapted to provide each processing or approving party with the created shipping documentation upon request. All information received and relied upon by this process is saved in a database for tracking the shipping material, and for auditing the shipping process.

19 Claims, 12 Drawing Sheets

Shipping

Per Move/Ship Ticket, shipping coordinator prompted to prepare materials/items for shipping. SI appears in Shipping view as "Dimensions". Shipping coordinator prompted to access SI in "Edit" mode and update Shipping section on SI with necessary Dimensions and then save SI. Shipping representative then prompted to create Packing Slip and Label by highlighting the SI within the category "Shipping Documents Needed" and select the "Create Shipping Docs" action button. Should a Packing Slip need to be refreshed after it is generated, a new one may be printed and the old discarded. Document Administration is notified automatically via electronic mail that Dimensions have been supplied. — 44

Document Administration

Document Administration Coordinator automatically notified via electronic mail that Dimensions have been supplied to SI by Shipping. SI appears in Document Administration view under category "SI Processing Needed". Document Administration Coordinator prompted to access SI in "Edit" mode, complete Document Administration section on SI and save. If Shipping dept. did not create Packing Slip, SI then appears in view as "Create Shipping Documents". If Packing Slip does exist, the SI automatically appears under the category "Processed". If a Packing Slip must be created, the Document Administration representative is prompted to highlight the SI in the view and select the "Create Shipping Docs" action button. Two Packing slips are printed-one forwarded to Shipping, one retained for filing. Bill of Lading and Label printed on respective form printers. Should a Packing Slip need to be refreshed after it is generated, Document Administration Coordinator prompted to select "Refresh Packing Slip" action button with the Packing slip. — 46

Shipping

Shipping Coordinator prompted to affix Packing Slip and Label to container(s), and Load materials/items on carrier. Access Shipping view, via the carrier "Ship Date Needed". Prompted to highlight SI and select "Enter Date Shipped" action button and complete Ship Date field. Requester notified automatically via electronic mail that the SI is closed - cycle complete. —— 48

Requester

Notified via electronic mail re SI status - cycle complete. Memo contains Tracking Number, Carrier info and a link to Shipment Tracking Web Site, should requester wish to track whereabouts. —— 50

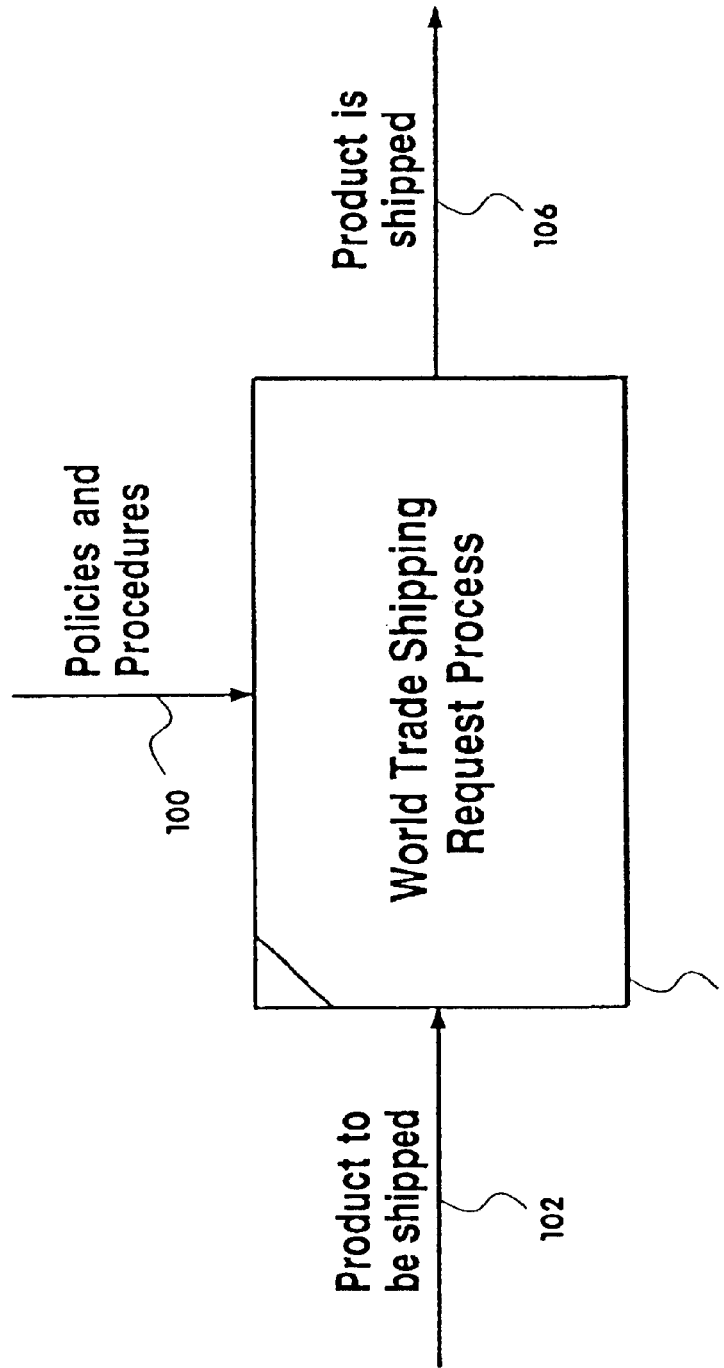

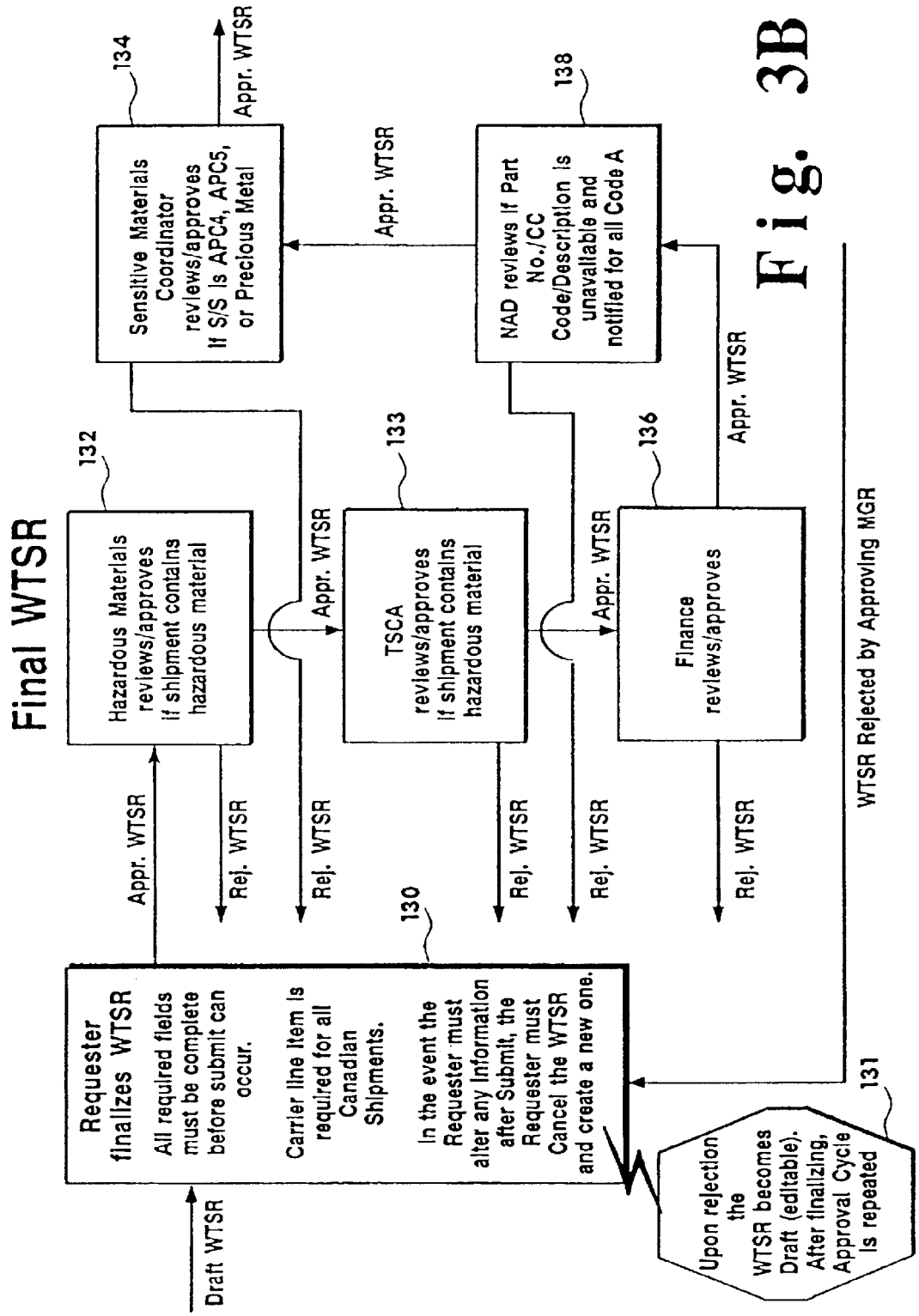

SYSTEM AND METHOD FOR SHIPPING MATERIAL

BACKGROUND OF THE INVENTION

1. Field of the Invention

The present invention relates generally to the shipment of goods and materials, specifically to a system and method for coordinating and approving shipping information. More particularly, the present invention relates to a system and method for consolidating manual shipping processes and automated technology, allowing for on-line approvals, validations, associated documentation, securing of asset protection, and providing for computerized tracking.

2. Description of Related Art

Coordinating shipping information is difficult to achieve, and typically involves numerous approvals, and a large quantity of associated documentation. Current procurement procedures in corporations of all sizes are largely manual, or at best semi-automated by electronic mail, and as a consequence, are labor-intensive and costly. These problems are magnified when goods and materials are required to be routed for world trade distribution, and for validations of appropriate classifications prior to export. Export exposure, fines, and even the loss of export licenses may result from improperly validated or non-validated shipping requests or shipping instructions.

Corporations generally require multiple levels of authorization for exporting goods and materials. Corporate policies and procedures are typically generated for products to be shipped, and then must be integrated within the Shipping Request Process in order to ensure compliance with export regulations and corporate directives.

A drawback in coordinating shipping request/approval information via conventional methods is the danger that all the necessary approvals and validations will not be available when needed to effectuate shipment. Also, in a lengthy approval cycle, it is desirable to know at any given time the approval status of a particular request.

In U.S. Pat. No. 6,015,157 issued to Savino, et al., on 18 Jan. 2000 entitled "SYSTEM AND METHOD OF EMPLOYING A SINGLE BAR CODE FOR COORDINATING SHIPPING AND RECEIVING INFORMATION," a single authorization command is supplied by a customer for the immediate shipment of selected items. This is accomplished by a customer digital processor coupled to a supplier digital processor via a communications link for selecting and authorizing the shipment of ordered parts by means of the authorization command. A single bar code is generated and provided on a shipping label in response to the authorization command. However, no attempt is made to acquire multiple approvals and validations from various customers or departments within an organization to effectuate shipment, to track authorizations automatically and on request, or to create a final shipping document for exporting goods.

Other data tracking systems facilitate shipping products in containers marked with shipping labels and advance shipping notices that include specific consignee information. For example, in U.S. Pat. No. 5,315,508 issued to Bain et al., on 24 May 1994, entitled "LABEL GENERATING AND DATA TRACKING SYSTEM FOR PROCESSING PURCHASE ORDERS," a purchase order processing system allows for purchase orders issued from a number of consignees, each requiring different processing operations. However, no final shipping documents are created, nor are any provisions made for multiple interactive authorizations.

The instant invention monitors the cycle life of all shipping instructions and their associated move/ship tickets, packing slips, bills of lading, and labels, from the point of origination by a requester, through any and all approvals that are required to effectuate shipment, and finally through the point of materials leaving the shipping dock. The documentation produced is generated to be in full compliance with export and International Trade Laws.

Bearing in mind the problems and deficiencies of the prior art, it is therefore an object of the present invention to provide a system and method for shipping material through which requesters, approving parties, and processing parties are notified that domestic and international shipping instructions require their attention and authorization.

It is another object of the present invention to provide a system and method for shipping material wherein all associated documentation is produced for full export compliance with International Trade Laws.

A further object of the invention is to provide a system and method for shipping material that includes edit controls to secure asset protection.

Yet another object of the invention is to provide a total closed loop shipping business process that accommodates the requestor and multiple approving organizations, notifies organizations of shipment, and generates all necessary shipping documentation.

Still other advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for shipping material, comprising: submitting a shipment request, the request containing shipment information; generating domestic and international control characteristics; accessing a delegation database to determine ownership of the control characteristics; automatically forwarding the control characteristics to control points; automatically notifying processing parties of approvals; automatically providing processing parties with documentation; and storing in a database information for tracking the shipping material and auditing the method. The shipment information may further include international shipment information. The method may electronically provide fields for a requester to input shipping information. The method further comprises notifying requirements for export controls, finance controls, hazardous material controls, sensitive material controls, traffic controls, hand-carry authorizations, and security controls. The step of automatically notifying processing parties of approvals includes providing electronic mail to a plurality of persons authorized to approve specific portions of the request. The method may be implemented through application software that provides for limited programmability.

In a second aspect, the instant invention is directed to a method for electronically acquiring request and authorization information and documentation for the shipping of material, comprising: providing an electronic database adapted to receive a shipping instruction from a requester; verifying the requester; providing fields in the electronic database for approvals of the shipping instruction; notifying the requester's approving manager or approving manager designee of the request for an initial approval; providing for a document link within the electronic database to view the request; prompting the approving manager or the approving manager designee to assign a status for the request; notifying next required approving manager or next required approving manager designee after the initial approval; prompting the requester to prepare documents for moving goods and materials to a designated shipping location; notifying the requester continuously via electronic mail of the status of the request; notifying the requester of approved request after all approvals have been granted; generating shipping documentation at the requester's initiation; and storing in a database information for tracking the shipment material and auditing the method.

In a third aspect, the instant invention is directed to a program storage device readable by machine, tangibly embodying a program of instructions executable by the machine to perform method steps for shipping material, the method steps comprising: submitting a shipment request, the request containing shipment information; generating domestic and international control characteristics; accessing a delegation database to determine ownership of the control characteristics; automatically forwarding the control characteristics to control points; automatically notifying processing parties of approvals; automatically providing processing parties with documentation; and storing in a database information for tracking the shipping material and auditing the method.

In a fourth aspect, the instant invention is directed to a program storage device readable by machine, tangibly embodying a program of instructions executable by the machine to perform method steps for shipping material, the method steps comprising: providing an electronic database adapted to receive a shipping instruction from a requester; verifying the requester; providing fields in the electronic database for approvals of the shipping instruction; notifying the requester's approving manager or approving manager designee of the request for an initial approval; providing for a document link within the electronic database to view the request; prompting the approving manager or the approving manager designee to assign a status for the request; notifying next required approving manager or next required approving manager designee after the initial approval; prompting the requester to prepare documents for moving goods and materials to a designated shipping location; notifying the requester continuously via electronic mail of the status of the request; notifying the requester of approved request after all approvals have been granted; generating shipping documentation at the requester's initiation; and storing in a database information for tracking the shipment material and auditing the method.

In a fifth aspect, the instant invention is directed to a system for coordinating and approving shipping information for the shipment of goods and materials, the system comprising: a server having central computer processing capabilities, adapted to perform the following functions: generating domestic and international control characteristics; accessing a delegation database to determine ownership of the control characteristics; automatically forwarding the control characteristics to control points; automatically notifying processing parties of approvals; automatically providing processing parties with documentation; and storing in a database information for tracking the shipment and auditing the method; and a plurality of interactive input/output sites attached to the server for inputting and reviewing shipment requests.

In a sixth aspect, the instant invention is directed to a system for coordinating and approving shipping requests for the shipment of goods and materials, the system comprising: a server having central computer processing capabilities, adapted to perform the following functions: providing an electronic database adapted to receive a shipping instruction from a requester; verifying the requester; providing fields in the electronic database for approvals of the shipping instruction; notifying the requester's approving manager or approving manager designee of the request for an initial approval; providing for a document link within the electronic database to view the request; prompting the approving manager or the approving manager designee to assign a status for the request; notifying next required approving manager or next required approving manager designee after the initial approval; prompting the requester to prepare documents for moving goods and materials to a designated shipping location; notifying the requester continuously via electronic mail of the status of the request; notifying the requester of approved request after all approvals have been granted; generating shipping documentation at the requester's initiation; and storing in a database information for tracking the shipment and auditing the method; and a plurality of interactive input/output sites attached to the server for inputting and reviewing the shipment instruction.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2 is a process flow overview for a world trade shipping request.

FIG. 3B depicts a detailed flow diagram of the process flow for a final world trade shipping request.

DESCRIPTION OF THE PREFERRED EMBODIMENT(S)

Figure 1:
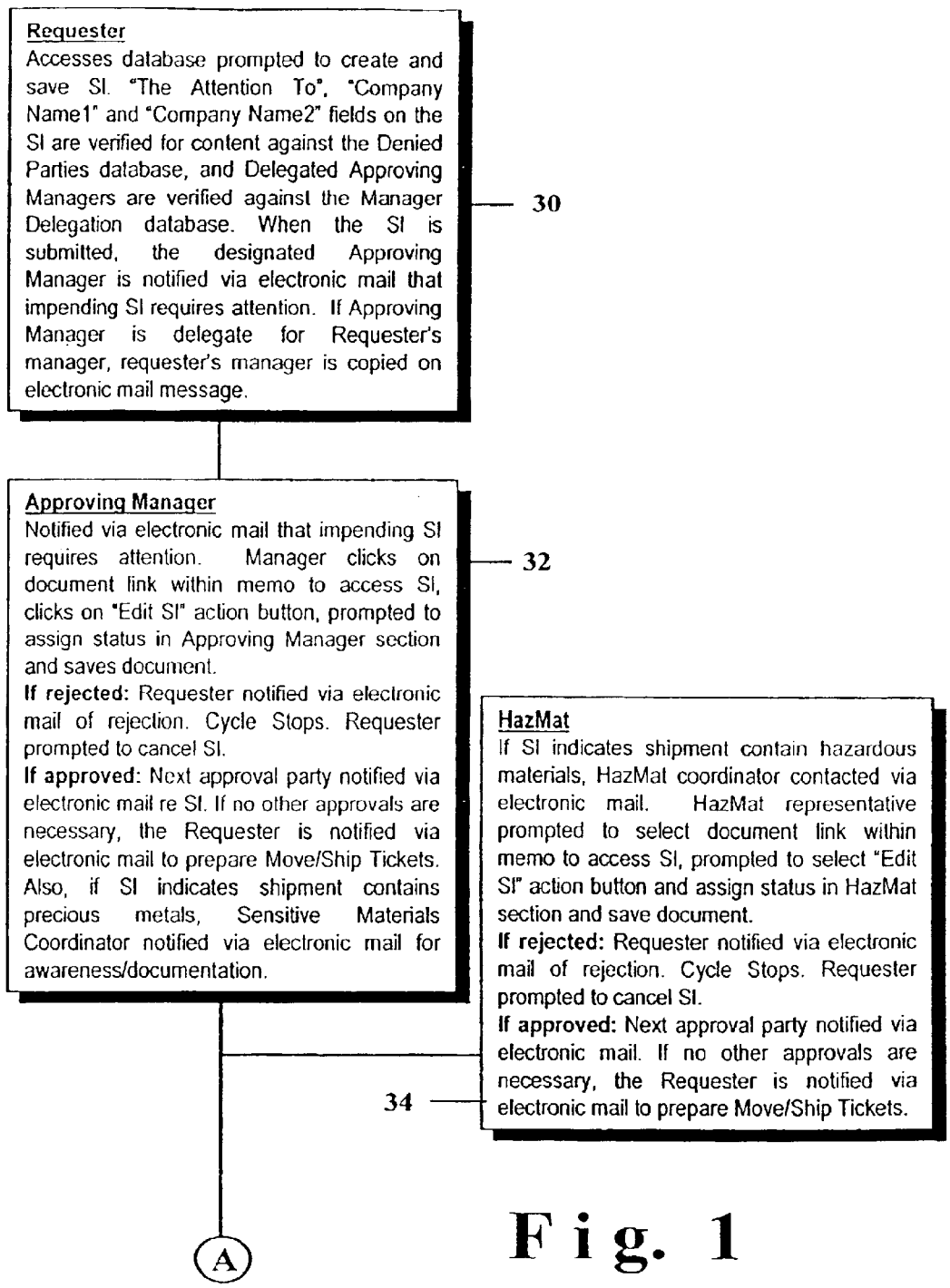
FIG. 1 is a process flow diagram of how the shipping process is implemented in a general corporate hierarchy structure.
Figure 1:
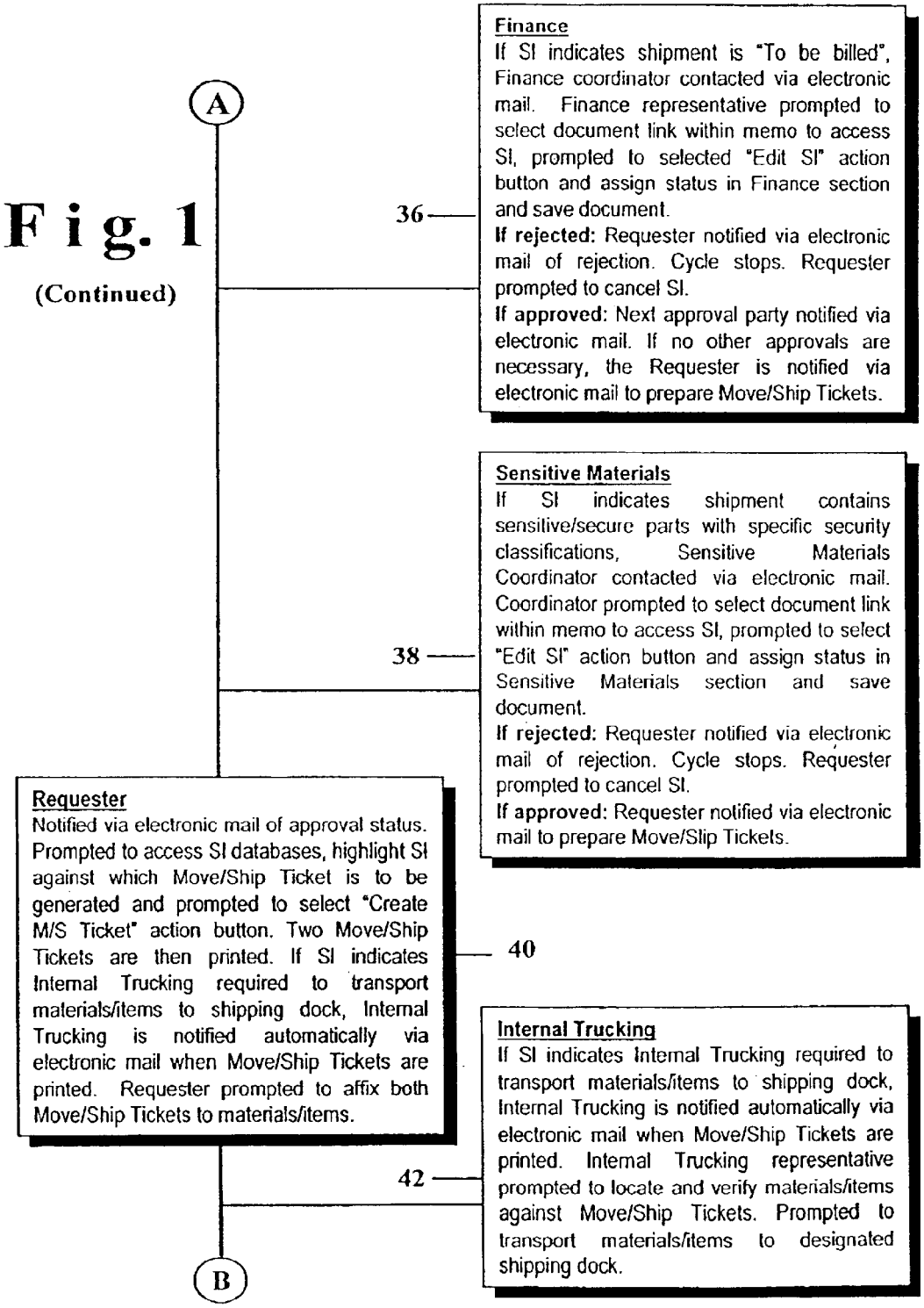

In describing the preferred embodiment of the present invention, reference will be made herein to FIGS. 1–4 of the drawings in which like numerals refer to like features of the invention. Features of the invention are not necessarily shown to scale in the drawings.

The system and method for shipping material described herein may be implemented through application software that provides for some limited programmability, such as Lotus Notes Application Technology. Other application software packages may be used provided they allow for software design of application. In the alternative, high level program languages may also be used to implement the method steps.

The invention commences with a requester being prompted to generate and submit a shipping request or shipping instruction (SI). The requester is expected to complete the shipping request by inputting information such as: company name of the requester, company name of the recipient, and all pertinent information for the "attention to" fields of the request. The "attention to" fields generally denote several approval managers or manager delegates for authorization purposes. Once the requestor completes the shipment request, the shipment is then identified for domestic or international shipping. Control characteristics are identified and designated for domestic and international shipment. Export controls, finance controls, hazardous material controls, and sensitive material control characteristics are identified. Databases are made available to facilitate the determination of proper ownership or responsibility for each control characteristic identified. The control characteristics are forwarded to specific control points for authorization or approval. For example, the request is routed automatically through an approval/rejection process which, along with the aforementioned control authorizations (export, finance, hazardous and sensitive materials, and the like), traffic, security, and hand carry authorizations are also solicited. Each authorization party is automatically notified of approvals or rejections.

Immediately prior to shipping, the requester, export control coordinator, and shipping coordinator are notified of the shipment. Once the shipment has been effectuated, shipment notification is performed electronically for the requester, export coordinator, country coordinator, internal trucking manager, shipping coordinator, hand carry coordinator, traffic officer, security officer, and customer. The process, continuously updated for web-based tracking, is then closed with the delivery of the shipped goods and/or materials.

This method allows for interactive inquiry and editing throughout the life cycle of the shipping request by the requester and various approving managers. Once the request is approved, shipping labels are automatically printed, and any necessary export documentation is electronically prepared by the application software. The application is capable of being adapted to provide each processing or approving party with the created shipping documentation upon request. All information received and relied upon by this process is saved in a database for tracking the shipping material, and for auditing the shipping method.

FIG. 1 depicts how the shipping instruction process flow of the present invention is implemented in a general corporate hierarchy structure. The system and method can be implemented using common application software adapted for programmability, preferably Lotus Notes Application Technology, although other programmable application packages may be used, including adapting high level program languages to perform the intended functions. Preferably, the method is performed on a computerized network, typically including a server and various interactive device terminals.

The requester initially accesses an electronic database to submit the shipping instruction 30. The system then verifies the request for content against a database to ensure a proper requester. This database is sometimes referred to as the "denied parties" database. A list of unapproved requester names or other identifiers resides on the database. The list is compared to the requester name or other identifier at the onset of the request. If the requester's identification matches an identifier on the list, the request is immediately denied. This database may also be configured for a list of accepted requesters, in which case, a match of the requester's name or other identifier with a name or identifier on the accepted requesters' list would allow a request to proceed. In similar fashion, any listed approving manager or manager's delegate is then verified against a manager delegation database to ensure proper authorization.

When the shipping request is submitted, the requester's designated approving manager is notified via electronic mail, preferably Lotus Notes Mail, that an impending shipping request requires attention. If the approving manager is a delegate for the requester's manager, the requester's manager is also copied on the electronic mail message.

Once this shipping request is initiated, preferably there is no allowance for alteration by the requester. In the event the requester must change the approving manager, or alter any other field in the request after the shipping request has been entered, saved and routed, the requester may create a new shipping request and cancel the previous request.

When notified that a particular shipping request requires attention, the requester's approving manager or manager delegate 32 may select the appropriate document link within the electronic mail message to access and view the request. The link allows the viewer to view the request and all its contents in its entirety. At this time, the requester's approving manager may edit the shipping request. One such way to allow for editing of the request is to establish an edit button or soft-key on the display screen and have the requester's approving manager select this button. However, other edit designators that may be specific to another programmable application package may be implemented, provided that the viewer is allowed to edit and save the submitted request once this edit function is initiated. The requester's approving manager must then assign a status for the shipping request in the approving manager section of the request form. The requester's approving manager is then prompted to save the document.

If the requester's approving manager rejects the shipping request, the requester is notified by electronic mail and the shipping request cycle stops. The requester is then prompted to cancel the shipping request. When the requester's approving manager approves the shipping request, the shipping request progresses to the next required approving manager. This is accomplished by electronic mail, preferably via Lotus Notes Application Technology, or the like. The requester is then prompted via electronic mail to prepare documents for moving the goods and materials to shipping, commonly referred to as move/ship tickets.

In the event the shipping request indicates a shipment of precious metals, a sensitive material coordinator, or approved designee 38, is notified via electronic mail for awareness and documentation. Similarly, if the shipping request indicates that the shipment contains hazardous materials, the hazardous material (HazMat) coordinator, or approved designee 34, is contacted via electronic mail. Upon notification that a particular shipment contains hazardous material, a document link is provided within the electronic mail message so that the hazardous material coordinator may electronically access and view the shipping request. By activating the edit function associated with the particular application technology used to generate the shipping request, the hazardous material coordinator is prompted to assign a status in an appropriate section of the request, typically labeled the "HazMat" section. After editing, the hazardous material coordinator is then prompted to electronically save the shipping request document. Generally, after any editing, the person editing is prompted to save the document with the new data, so that other viewers can benefit from the edited material.

During any rejection to the request, the requester is notified that the request has been denied, and the shipping request cycle is immediately and automatically terminated.

If the shipping request indicates that a financial item is outstanding, for example, the shipment is designated "to be billed," the finance representative is notified via electronic mail 36. The finance representative, or an appropriate designee, is then prompted to select the document link within the shipping request electronic mail memorandum to access the shipping request, edit the request to include a status assignment in the finance section of the request, and save the document.

If the shipping request indicates that the shipment contains confidential or sensitive materials by exhibiting predetermined security classifications, the sensitive materials coordinator 38 is contacted via electronic mail. The sensitive materials coordinator, or an approved designee, is prompted to select the document link within the shipping request memorandum to access the shipping request, edit the request by assigning a status in the sensitive material section of the request, and save the shipping request document.

Subsequent approving parties are also notified in a similar fashion via electronic mail. Once all approvals have been granted and no other approvals are required, the requester is notified via electronic mail that the request was granted 40. The requester is then prompted to prepare move/ship tickets.

The requester is continuously notified via electronic mail of the approval status of the shipping request. Once the request is approved, the requester is prompted to access the shipping request database and highlight the shipping request against which the move/ship ticket is to be generated, and select a "create move/ship ticket" designator, or other similarly named function. This function initiates the generation of move/ship tickets automatically. A number of move/ship tickets may then be printed. Preferably, at least two move/ship tickets are generated with each activation of the "create move/ship ticket" function.

If the requester indicates "internal trucking" is required to transfer the goods or materials to an internal shipping dock, an internal trucking representative 42 is notified via electronic mail after the move/ship tickets are generated and printed. The requester is prompted to affix the move/ship tickets to the goods or materials being transported.

When the internal trucking representative is notified to transport goods or materials to an internal shipping dock, the internal trucking representative is prompted to locate and verify the goods or materials pursuant to the newly generated move/ship tickets. The internal trucking representative is then notified to transport the materials or items to the internal shipping dock as requested.

The shipping department, or other equivalent corporate organization, is then prompted to prepare the goods or materials for shipping 44 as identified on the move/ship ticket. The shipping representative is prompted to access the shipping request in the edit mode, and is notified to update the request in the shipping field with the necessary information, dimensions, weight, and the like, and prompted to save the request.

The shipping representative is then prompted to create a packing slip and label, and can accomplish this by highlighting the shipping request within the appropriate category, named "Shipping Documents Needed," or other similar designation, and selecting the "create shipping document" or like named function. The application is adapted to allow the packing slip to be reprinted if needed without retracing any prior shipping cycle steps.

Once shipping information has been supplied to the shipping request by the shipping representative, or appropriate designee, a document administration representative 46 is notified via electronic mail. The application software is adapted to allow the document administrative representative to view the shipping request under an appropriate designated category such as "Shipping Request Processing Needed," or the like. The application software is designed to allow the document administrative representative to access the shipping request in the edit mode, complete the document administration section, and save the result. If the shipping department did not create a packing slip, the request then prompts the document administrator to create the shipping documents. However, if the packing slip does not exist, the document administration representative is notified that shipping instructions have been processed.

When the document administration representative needs to create a packing slip, the request is adapted to be highlighted or selected in the viewing area and the function for creating shipping documents can be selected. Preferably, two packing slips are generated; one for forwarding to the shipping department, and the other for internal filing. The Bill of Lading and label may then printed on respective form printers, or the like.

Once printed, the packing slips are adapted to be attached to the containers by shipping representatives 48. The electronic request is further adapted to allow the shipping representatives access to the shipping view area of the request. The selection of the function for updating "ship date needed," or the like, is prompted for the shipping representative to enter the ship date in the appropriate field.

The requester is then notified via electronic mail that the shipping request is closed 50, and that the cycle is completed. The completed cycle notification, sent to the requester, is programmed to contain the tracking number, carrier information, and a link to a shipping tracking website to facilitate the tracking of the package's whereabouts during delivery.

FIG. 2 depicts an overview of the process flow for a world trade shipping request (WTSR). Policies and procedures 100 are incorporated by the application software for individualized corporate handling of world trade requests. Information regarding the product(s) to be shipped 102 are initial elements in the WTSR process function block 104. The result is a shipped product 106 meeting all internal and external requirements for domestic and international shipping.

Figure 3A:
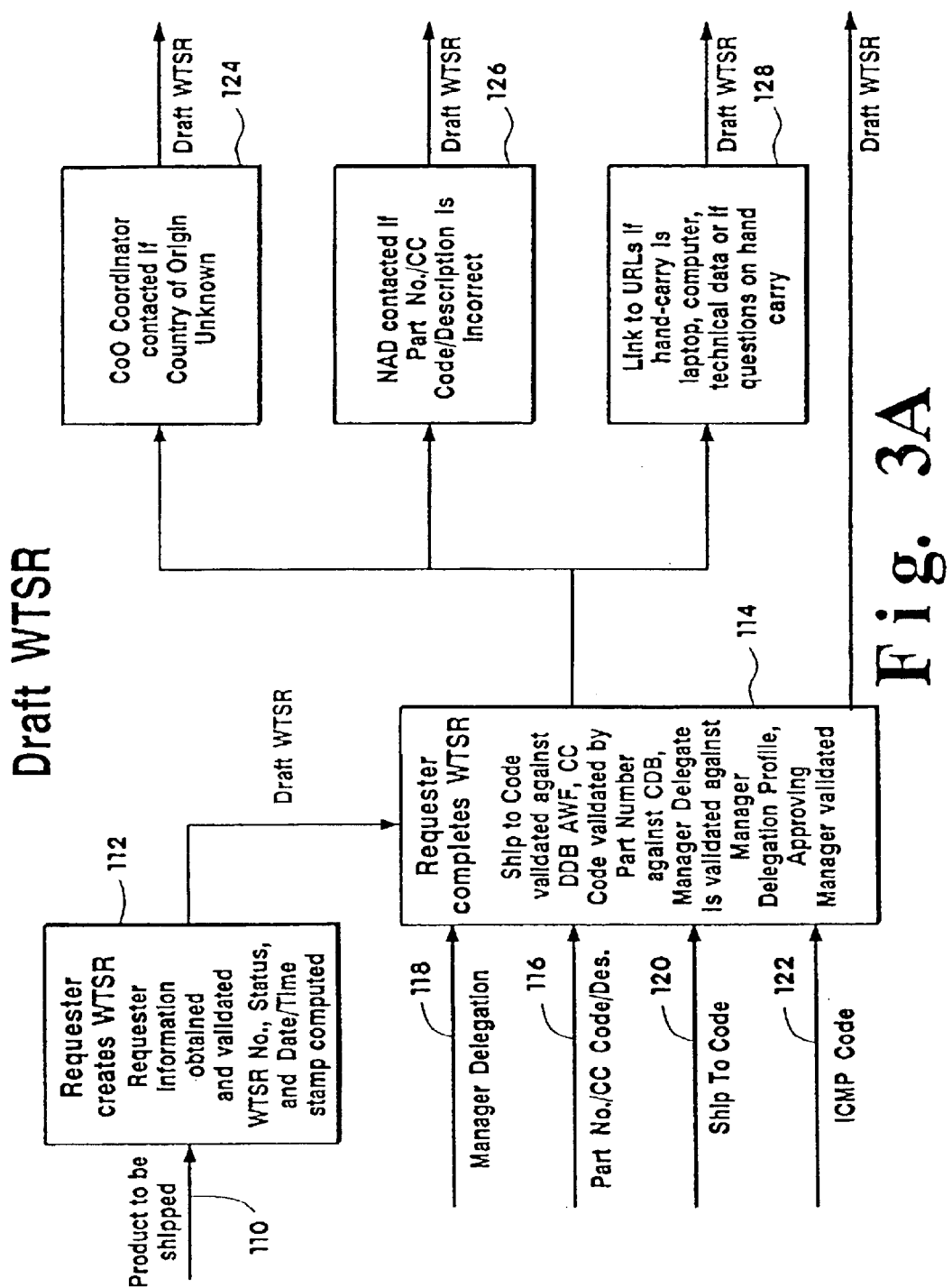
FIG. 3A depicts a detailed flow diagram of the process flow for a draft world trade shipping request.
Figure 3C:
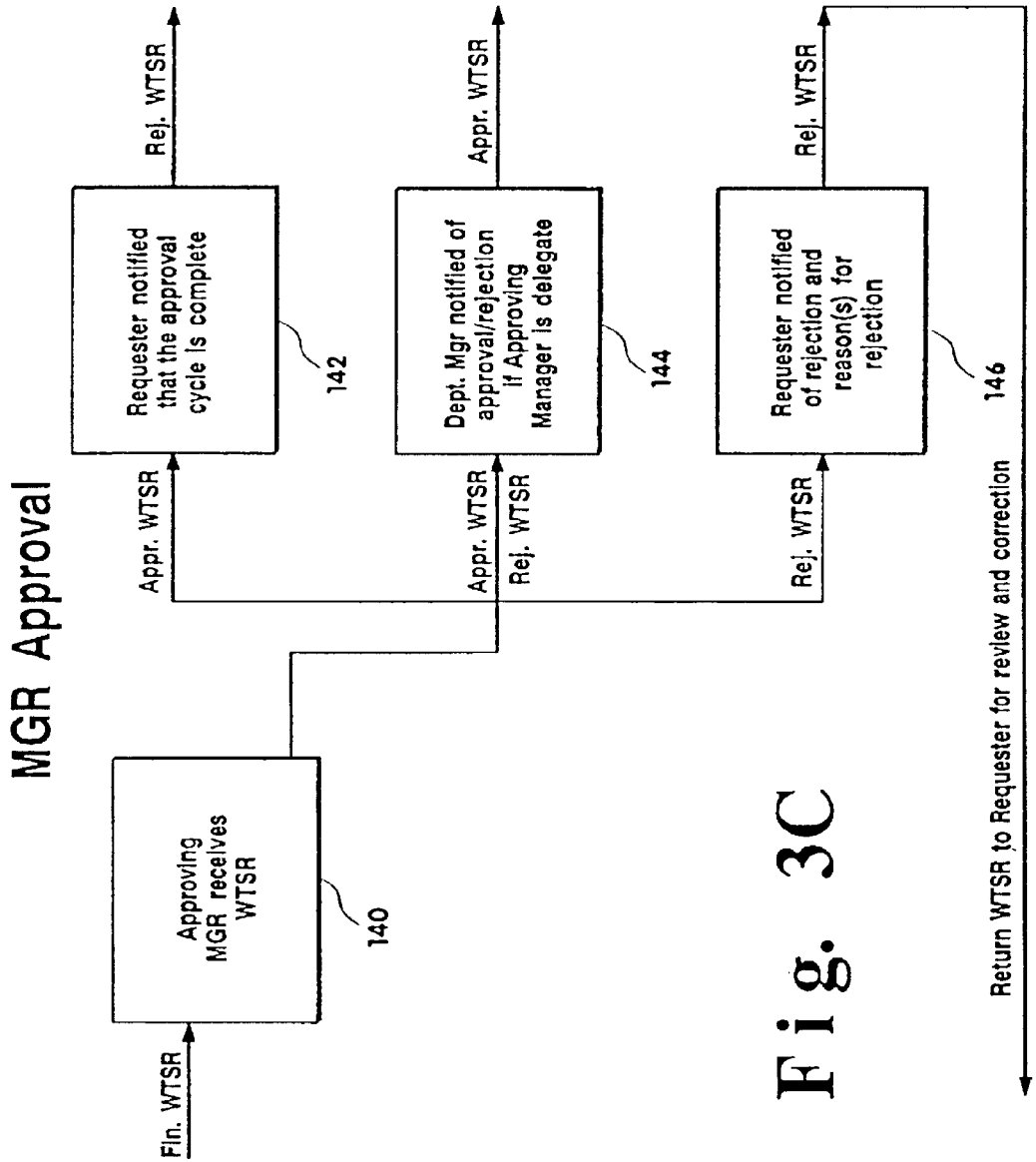
FIG. 3C depicts a detailed flow diagram of the process flow for the manager approval of a world trade shipping request.
Figure 3D:
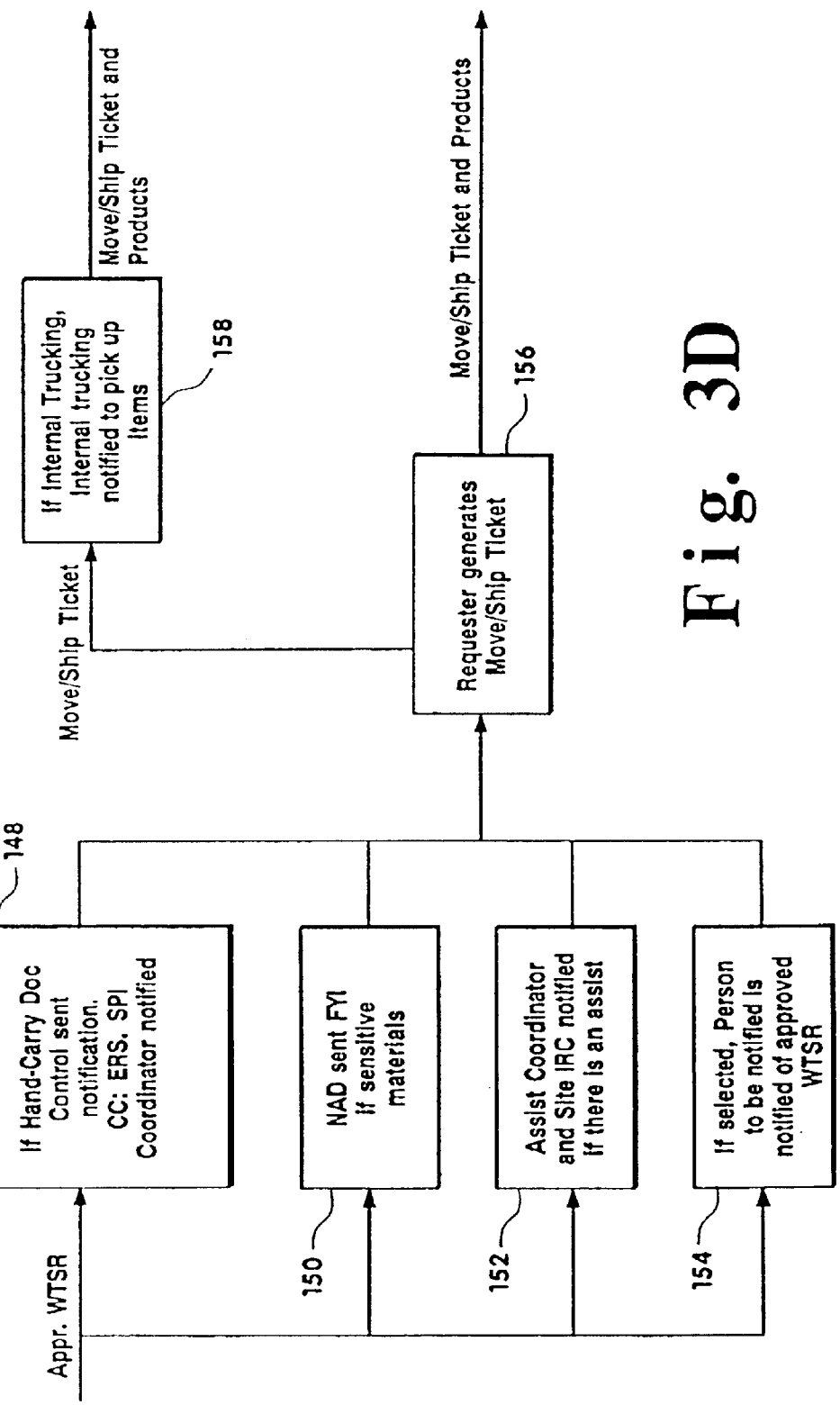
FIG. 3D depicts a detailed flow diagram of the process flow for an approved world trade shipping request.
Figure 3E:
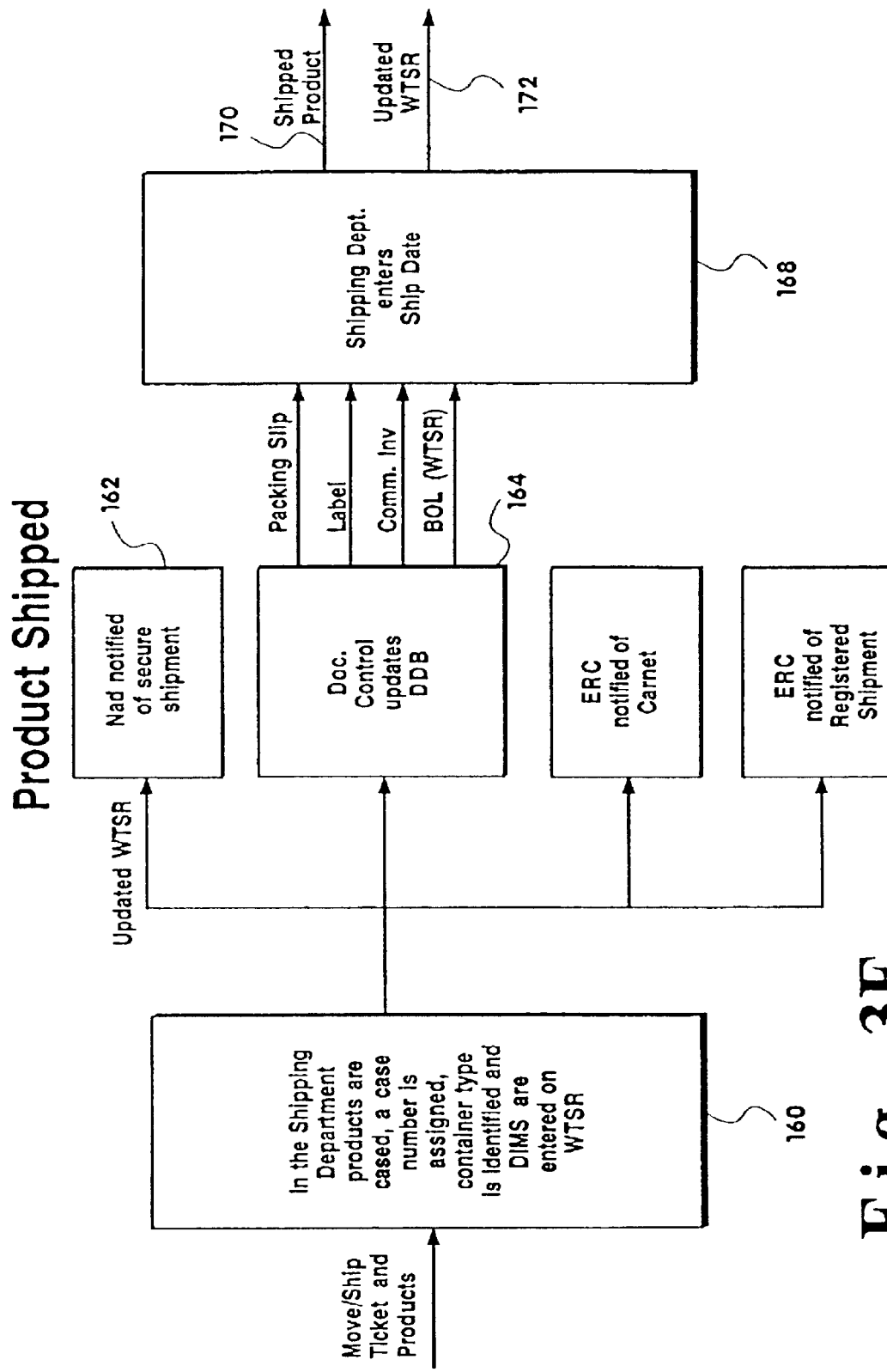
FIG. 3E depicts a detailed flow diagram of the process flow for shipping a product pursuant to a world trade shipping request.

FIG. 3A depicts a more detailed version of the process overview for a draft WTSR. Based upon the restrictions for an individual product to be shipped, the requester accesses the application program to create the world trade shipping request 112. Information is obtained and validated, including a WTSR number, date, time and status. The Ship-to-code restrictions are automatically validated, along with specific manager authorizations. Part numbers, country code designations 116, manager delegation databases 118, ship-to-code designations 120, and ICMP codes 122 are reviewed, verified, and validated at this stage of the process 114. If necessary, a Country of Origin Coordinator is electronically contacted 124 if the product's country of origin is unknown. A part coordinator (NAD) is automatically electronically contacted 126 if the part number, country code, or part description is incorrect. For questions regarding hand-carry, an automatic link to a URL is achieved 128. At this juncture, the draft WTSR is then finalized. The process flow for a final WTSR is depicted in FIG. 3B. The requester finalizes the WTSR 130. All required fields are completed prior to submission. Specific country dependent restrictions are implemented. For example, carrier line items are typically necessary for all Canadian shipments. At this point, the request is complete and ready for submission for approval. Approvals covering hazardous materials 132 and 133, sensitive materials 134, finance 136, and parts control 138 are conducted. All rejected requests are automatically forwarded to the requester. Upon rejection, the WTSR becomes available for further editing 131. The final WTSR is then forwarded through an approval cycle as shown in FIG. 3C. First, the approving manager receives the WTSR 140. If approved, the requester is notified that the approval cycle is complete 142. If the approving manager is a manager delegate, the department manager is also notified of the approval or rejection 144. If the request is rejected, the requester is notified of and the reasons for the rejection 146. The post-approved WTSR process flow is depicted in FIG. 3D. Once the request is approved, certain departments are then notified. For example, those dealing with hand carry requirements 148, sensitive materials 150, site specific conditions 152, and receiving individuals or organizations 154, and the like, are electronically notified. Move/Ship tickets are automatically generated 156, and internal trucking personnel notified for items requiring pick-up 158. As shown in FIG. 3E, the product is then readied for shipment 160. Typically, the products are packaged or cased, a case number is assigned, a container type is identified, and dimensions are all prompted to be entered on the WTSR. If required, the updated WTSR may be adapted to trigger the notification of a secure shipment 162. Shipping documentation is automatically generated. Packing slips, labels, commercial invoices, and the like are created 164. A ship date is prompted to be entered 166, and the product is shipped 170 in accordance with the generated instructions 172.

Figure 3F:
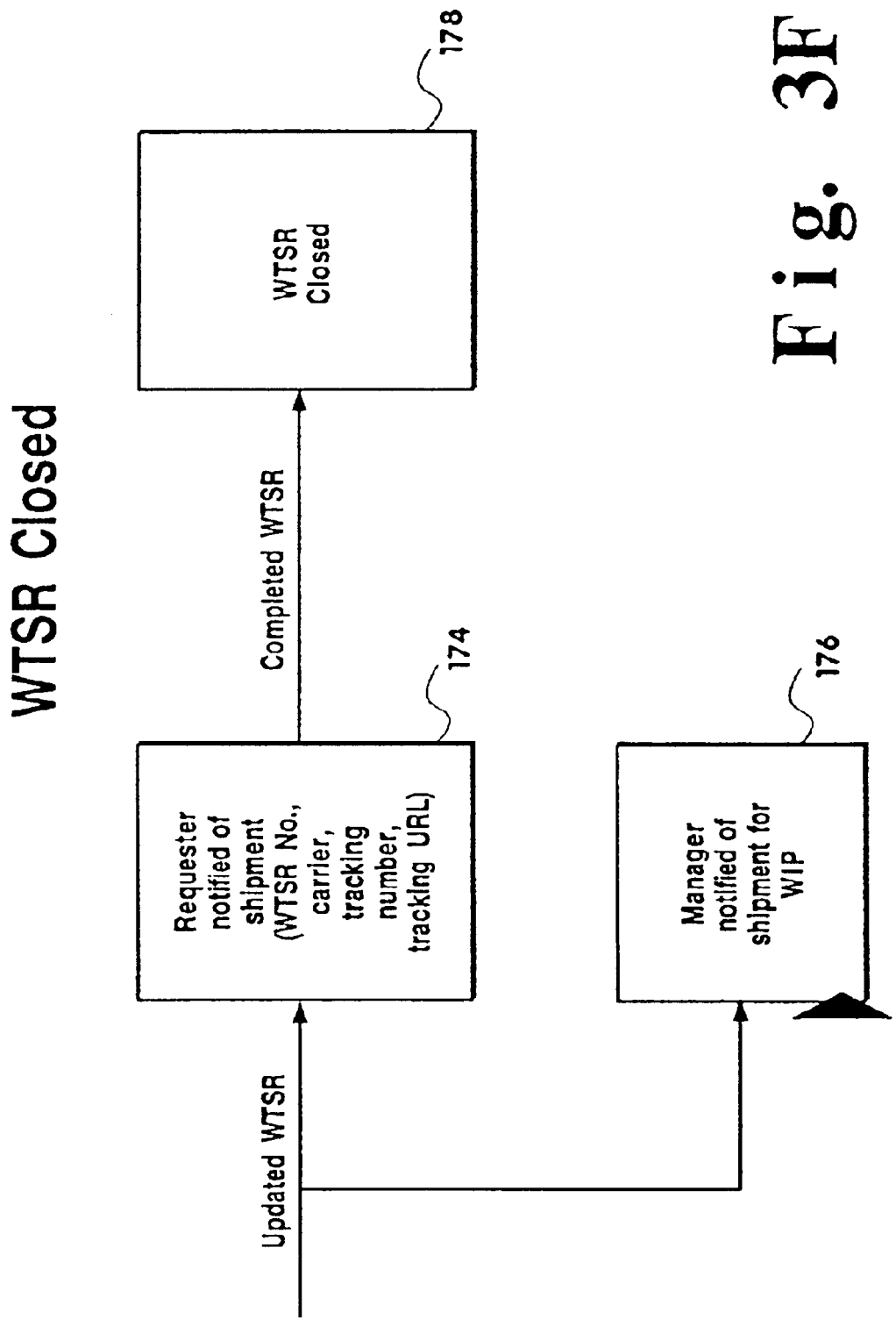
FIG. 3F depicts a detailed flow diagram of the process flow for closing out a world trade shipping request.

FIG. 3F depicts the closure process for the WTSR. The requester is notified of shipment 174 with information including the WTSR number, the carrier, the tracking number, and the tracking URL for online status. The approving manager is also notified of the shipment 176. At this stage, the completed WTSR is closed 178.

Figure 4:
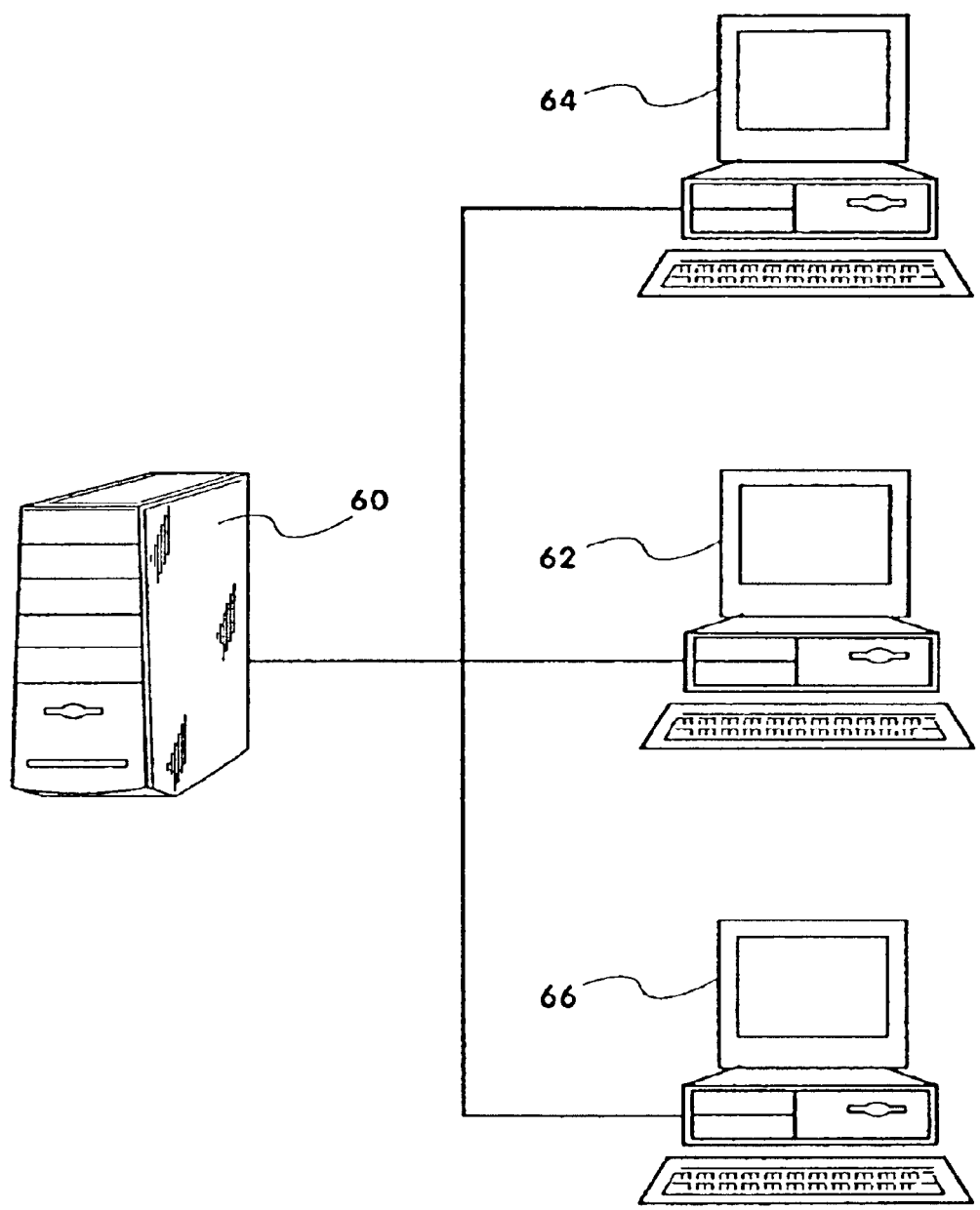
FIG. 4 is a connection diagram for the equipment capable of implementing the invention on an interactive computerized system.

This process may be run on Lotus Notes Application Technology or other programmable application software package, or high level programming language. To perform this process, a linked computer system is required as shown in FIG. 4, with interactive capabilities for each user. Typically, each interactive user interface is connected to a central processor or server 60 adapted to run the application software. The status of the shipping request is capable of being reviewed by each user on the system through a plurality of interactive device terminals 62, 63 & 64, and each request capable of being edited and saved as desired by users accessing these terminals. Through this approach, a shipping method can be implemented for example on Internet web-based applications, wherein the server is an Internet server, or one capable of being adapted for Internet use.

The application software implementing the method of the instant invention may be adapted for use through web-based application, to enable remote access to the shipping process, including remote approval authority, so that the invention need not be limited to one site or facility.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for electronically acquiring request and authorization information and documentation for the shipping of material, comprising:

providing an electronic database adapted to receive a shipping instruction from a requester;

electronically verifying said requester against said electronic database to ensure a proper requester;

providing fields in said electronic database for approvals of said shipping instruction;

notifying electronically said requester's approving manager or, approving manager designee of said request for an initial approval;

verifying electronically said approving manager or said approving manager designee against an electronic manager delegation database to ensure a proper authorization;

providing electronically for a document link within said electronic database to view said request;

prompting electronically said approving manager or said approving manager designee to assign a status for said request;

notifying electronically a requester's manager when said approving manager designee provides authorizations;

determining electronically from said request which next required approving manager or next required approving manager designee should be notified for awareness documentation, or approval;

notifying electronically said next required approving manager or said next required approving manager designee after said initial approval;

prompting electronically said requester to prepare documents for moving goods and materials to a designated shipping location;

notifying electronically said requester continuously via electronic mail of the status of said request;

notifying electronically said requester of approved request after all approvals have been granted;

generating electronically shipping documentation at said requester's initiation; and storing in a database information for tracking said shipment material and auditing said method.

2. The method of claim 1 wherein verifying said requester comprises electronically matching identification of said requester to an allowed or denied requester database.

3. The method of claim 1 wherein notifying said requester's approving manager or approving manager designee of said request for an initial approval comprises notifying via electronic mail.

4. The method of claim 1 further comprising electronically copying said approving manager if said designee gives approval.

5. The method of claim 1 wherein notifying said requester's approving manager or approving manager designee of said request for an initial approval further comprises verifying electronically said approving manager or said approving manager designee.

6. The method of claim 5 wherein verifying said approving manager or said approving manager designee comprises notifying by electronic mail.

7. The method of claim 1 wherein providing for a document link within said electronic database to view said request further provides for viewing all contents of said request in its entirety.

8. The method of claim 1 wherein providing for a document link within said electronic database to view said request further provides for adapting said request to allow said approving manager or said approving manager designee to edit said request.

9. The method of claim 8 wherein said step of allowing said approving manager or said approving manager designee to edit said request includes providing for an edit softkey for said manager to elect.

10. The method of claim 1 wherein said step of prompting said approving manager or said approving manager designee to assign a status for said request further includes electronically canceling said request in its entirety when said request is denied.

11. The method of claim 10 wherein said step of prompting said approving manager or said approving manager designee to assign a status for said request further includes prompting electronically said approving manager or said designee to electronically save said request.

12. The method of claim 1 wherein said step of notifying the next required approving manager or next required approving manager designee after said initial approval includes notifying via electronic mail.

13. The method of claim 1 wherein said step of prompting said requester to prepare documents for moving goods and materials to a designated shipping location further includes automatically preparing move/ship ticket documents.

14. The method of claim 1 further comprising notifying a sensitive material coordinator if precious metals are involved in said shipment, said notification performed via electronic mail.

15. The method of claim 1 further comprising notifying a hazardous materials coordinator if hazardous materials are involved in said shipment, said notification performed via electronic mail.

16. The method of claim 15 wherein said hazardous material coordinator is prompted to assign a status through said document link and edit functions.

17. The method of claim 1 wherein after any editing is performed to said request, notification to save said request electronically delivered.

18. The method of claim 1 further comprising notifying electronically said requester after said request has been denied.

19. The method of claim 1 including automatically canceling said request immediately upon receiving a disapproval.

* * * * *